Figure 1:
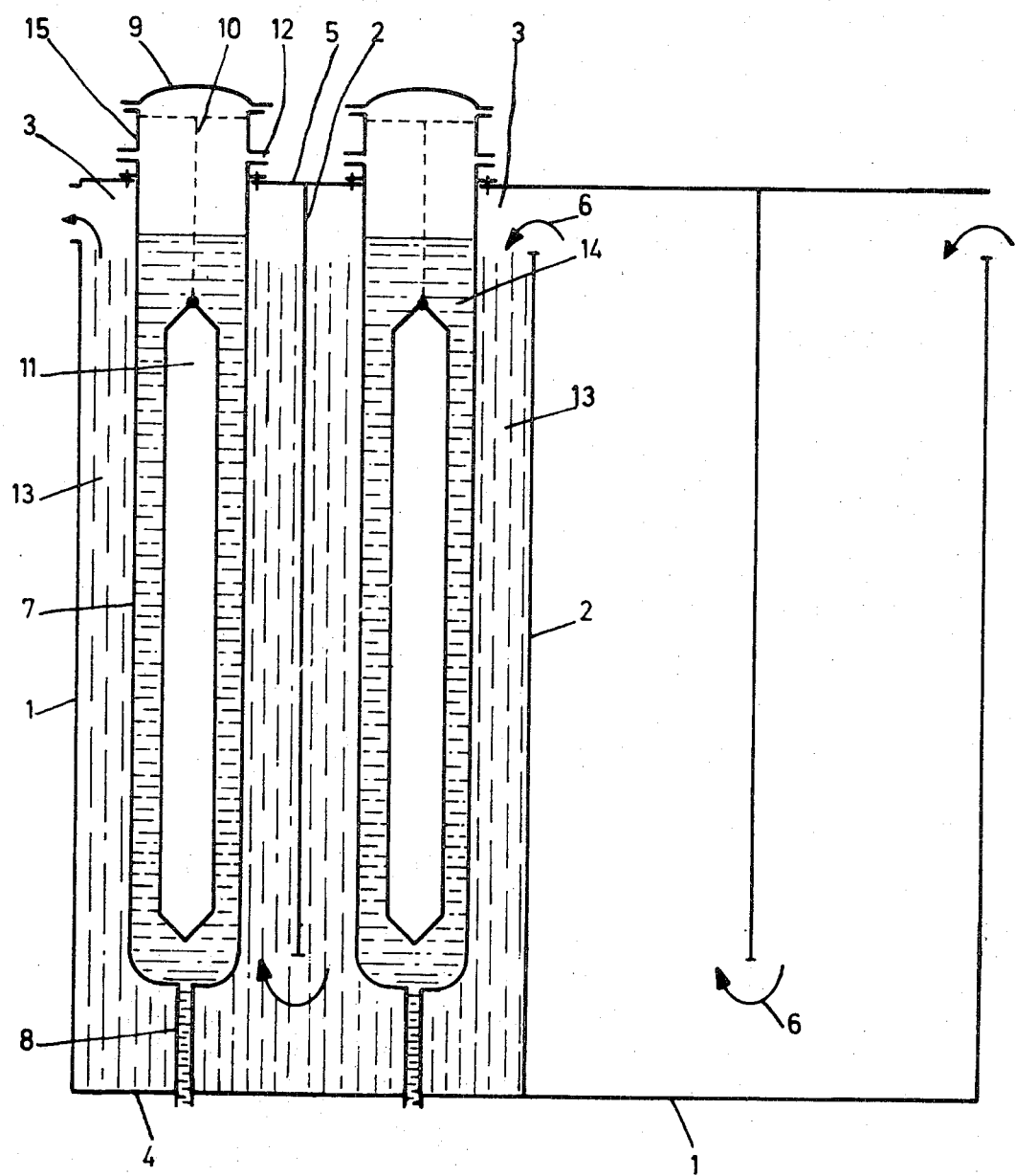

United States Patent [19]
Verbeke et al.

[11] 3,800,857
[45] Apr. 2, 1974

[54] PROCESS AND APPARATUS FOR THE STORAGE OF NUCLEAR-IRRADIATED FUEL ELEMENTS

[75] Inventors: Roger Verbeke, Mouscron; Paul Heylen, Mol, both of Belgium

[73] Assignees: Belgonucleaire; Centre D'Etude De L'Energie Nucleaire, both of Brussels, Belgium

[22] Filed: June 17, 1971

[21] Appl. No.: 154,056

[30] Foreign Application Priority Data
June 22, 1970 Netherlands.................... 7009149

[52] U.S. Cl..................................... 165/1, 165/107
[51] Int. Cl............................................ F28d 15/00
[58] Field of Search ............... 165/1, 106, 107, 104

[56] References Cited
UNITED STATES PATENTS
3,200,881  8/1965  Bucks et al. .................... 165/104

*Primary Examiner*—Charles Sukalo
*Attorney, Agent, or Firm*—Ostrolenk, Faber, Gerb & Soffen

[57] ABSTRACT

Fuel elements irradiated in a sodium-cooled nuclear reactor are stored by immersion in individual vessels containing a sodium-containing heat transfer fluid, which vessels are collectively placed in a larger vessel through which an organic heat transfer fluid is circulated.

4 Claims, 2 Drawing Figures

INVENTORS
ROGER VERBEKE
PAUL HEYLEN
BY
Ostrolenk, Faber, Gerb & Soffen
ATTORNEYS

PROCESS AND APPARATUS FOR THE STORAGE OF NUCLEAR-IRRADIATED FUEL ELEMENTS

BACKGROUND OF THE INVENTION

This invention relates to the storage of fuel elements irradiated in nuclear reactors, and more particularly to a process and apparatus for the storage of such elements which have been irradiated in a sodium-cooled nuclear reactor.

Fuel elements irradiated in a nuclear reactor are currently stored for a certain period of time prior to treatment in a reprocessing unit. During such period the fuel elements are cooled and the activity of the fission products formed during nuclear irradiation decreased. In this manner storage of the irradiated fuel elements contributes to the operation of a subsequent reprocessing unit.

Several possibilities have previously been considered for the storage of irradiated fuel. One such technique involves the storage of such materials under water for several months. Such a procedure is applicable to fuel elements irradiated in thermal reactors; it may not, however, be employed for fuel elements irradiated in sodium-cooled reactors in view of the high latent heat of such elements and because of the violent reaction between water and sodium. At the present time, fuel elements of the latter type are stored under sodium.

Storage of irradiated fuel elements under liquid sodium possesses both technical problems and high costs. Thus, large quantities of sodium which must continually be purified and maintained in the molten state are required for such operations. Furthermore, sodium-cooled storage facilities require double refrigeration circuits or complicated heat exchange means, as well as special protective devices for avoiding sodium leaks.

Accordingly, it is among the objects of the present invention to provide an improved process and apparatus for the storage of fuel elements irradiated in sodium-cooled nuclear reactors.

SUMMARY OF THE INVENTION

In accordance with the present invention, a process is provided for the storage of fuel elements previously irradiated in sodium-cooled nuclear reactors, in which each such element is immersed in a first vessel containing a sodium-containing heat transfer fluid, such vessel is placed in a second vessel, and an organic heat transfer fluid is circulated through the second vessel to cool the fuel elements. The invention further comprises an apparatus for carrying out such process, in which a plurality of the first vessels adapted to contain the respective irradiated fuel elements to be stored are mounted within the second vessel, and the latter is provided with baffle means defining a flow path for the organic heat transfer fluid past each of the first vessels, and inlet and outlet means for circulating such fluid therethrough.

By providing the storage-coolant system hereof, the disadvantages attendant to the use of a sodium-coolant storage system are obviated, and substantially greater latitude and economy in the choice of the heat transfer fluid utilized for storage of the fuel elements is provided.

THE DRAWINGS

Figure 2:
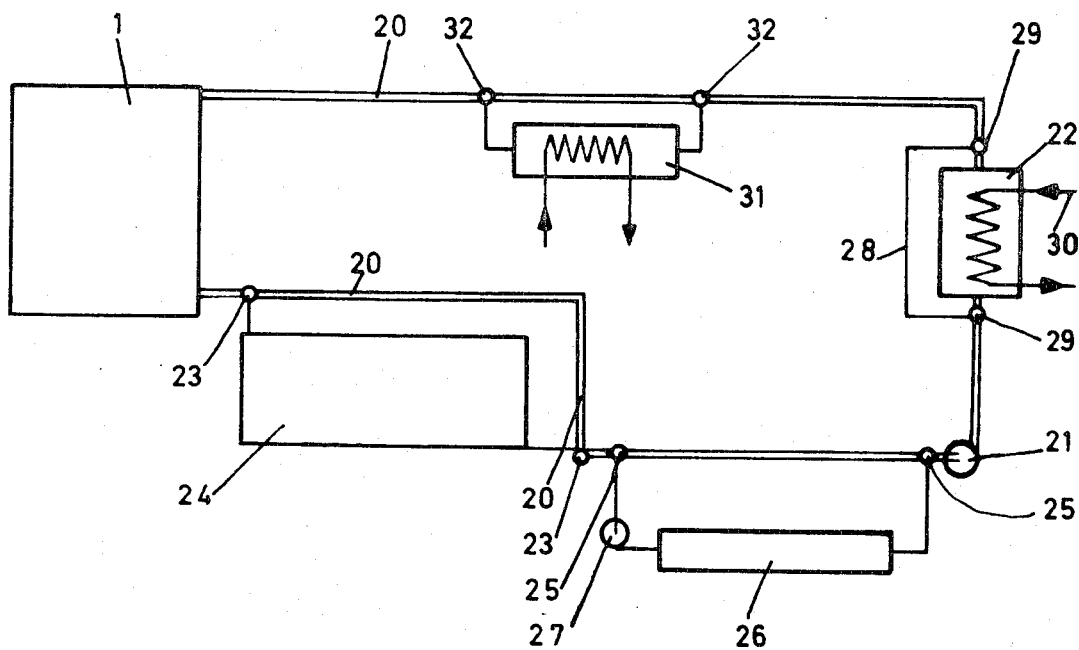

The invention is more fully described hereinafter in connection with a preferred embodiment thereof, described with reference to the accompanying drawings, in which:

FIG. 1 is a schematic, longitudinal cross-section of a portion of a storage vessel employed in accordance with the present invention; and FIG. 2 is a heat transfer circuit utilized in conjunction with the storage vessel shown in FIG. 1.

PREFERRED EMBODIMENT OF THE INVENTION

In one preferred from of the invention fuel elements previously irradiated in sodium-cooled reactors are stored within individual vessels, immersed in a sodium-containing heat transfer fluid, the several vessels containing such elements being disposed in turn within a second vessel or tank through which an organic heat transfer fluid is continuously circulated to thereby cool the fuel elements and maintain the same for subsequent processing. As used herein, the term "sodium-containing heat transfer fluid" is intended to refer to any sodium-containing molten coolant, e.g., sodium metal or sodium-potassium alloy, conventionally employed in nuclear reactor technology for heat transfer purposes. Similarly, the term "organic heat transfer fluid" designates any of the conventional inert organic heat transfer media which are compatible with the sodium-containing heat transfer fluid and are preferably fluid at ambient temperatures, up to 300 °C.

The organic heat transfer fluid is chosen in known manner, consistent with its thermal properties (including its heat capacities and other heat transfer characteristics), its resistance to irradiation and, of course, its cost. Moreover, the fluid should be non-corrosive, non-inflammable and non-polymerizable under the conditions utilized. Materials so useful include, for example, various acyclic hydrocarbons such as perhydrosqualene; aromatic hydrocarbons such as various of the alkyl benzenes, diphenyl, isopropyl diphenyl, terphenyl, and various alkyl phenanthrenes; halogenated aromatic hydrocarbons such as o-dichlorobenzene or various of the chlorinated diphenyls; and other recognized organic coolants such as the tetraryl silicates, the "Dowtherms" (e.g., the eutectic mixture of 73.5 percent diphenyl oxide and 26.5 percent diphenyl); and the like. Other materials useful as organic heat transfer fluids in the practice of the present invention will be obvious to those skilled in the art.

Turning to the preferred embodiment shown in the drawings, in FIG. 1 there is illustrated a vessel or tank 1 provided with baffles 2 dividing the tank into a number of different compartments 3. The baffles are fixed to the bottom 4 or the top 5 of the tank and are so disposed as to provide for the circulation of an organic heat transfer fluid 13 therethrough. Such fluid passes from the inlet port of tank 1, flows in the direction of arrows 6, and exits from the tank through the outlet port illustrated.

A vessel 7 is placed within each compartment 3 of the tank, suitably secured to the top 5 thereof. Each such vessel is provided with a suitable inlet 8 for a sodium-containing heat transfer fluid 14 and an extension 15 incorporating an upper surface 9 from which a suspension means 10 may be mounted for supporting an individual, previously irradiated fuel element 11 to be stored. The fuel element 11 is thus maintained within vessel 7, immersed within the sodium-containing heat transfer fluid. Such gas sweeps out or flushes away fission gases which might be liberated from the fuel elements during storage.

Inlet and outlet ports 12 are provided within extension 15 of vessel 7 for the circulation of an inert gas therethrough.

The heat exchange circuit for the organic heat exchange fluid 13 fed through tank 1 is illustrated in FIG. 2 of the drawings. The circuit 20 shown includes a circulation pump 21 and a heat exchanger 22. Valve 23 connects circuit 20 with a reservoir or storage tank 24 for the organic heat transfer fluid. The circuit 20 is further connected by valve 25 and pump 27 to a suitable purifying means 26.

When it is not desired to utilize the heat exchanger 22, the exchange fluid may be passed through bypass 28 by actuation of valves 29. Alternatively, when it is necessary to cool the organic heat exchange fluid such may be passed through exchanger 22 and cooled to any desired temperature by a suitable coolant 30, e.g., water. A further heat exchanger 31 communicating with the circuit 20 through valves 32 may also be provided for heating the organic fluid, if so desired.

In accordance with one preferred form of the invention, the tank 1 is 10 meters long, 10 meters deep, and 5 meters high. Each of the baffles 2 is 4.5 meters high and sufficient baffles are employed to divide the tank into 400 compartments 3 for receiving the respective fuel element-containing vessels 7.

A non-corrosive alkyl phenanthrene coolant, inert with regard to both sodium and water and having good thermal and radiolytic stability and having the liquid form from ambient temperature up to about 300 °C is utilized as the organic heat transfer fluid 13. A material so useful is produced by the catalytic decomposition of crude oil at temperatures between 312° and 362° C. The sodium-containing heat transfer fluid 14 in which the individual fuel elements are immersed in the vessels 7 comprises liquid sodium.

In operation, the alkyl phenanthrene is passed through tank 1 at a rate of 20 cm. per second. The tank is subdivided into two circuits, each containing about 150 tons of the alkyl phenanthrene heat transfer fluid continuously circulated therethrough.

The alkyl phenanthrene is introduced through the inlet port into the tank at a temperature of 120° C and removed through the exit port at a temperature of 180° C. The maximum temperature at the surface of the fuel elements 11 thus stored is about 230° C. Said temperature would increase 40° C per hour, were the circulation of the alkyl phenanthrene to be interrupted. The latent heat transferred to the heat transfer media by the previously irradiated fuel elements is partially recovered in heat exchanger 22 by countercurrent exchange with cooling water.

The fuel elements are thus gradually cooled without interaction with the primary sodium coolant and without the additional expense inherent in the use of the latter material as the sole coolant employed.

It will be understood that the details of the above-described preferred embodiment of the process and apparatus hereof may be modified without departing from the scope of the present invention. Hence, a number of fuel elements may be placed in each of the vessels 7, or such vessel and the coolant circuit therefor may otherwise be adapted to the reprocessing unit. Since these or many other changes may readily be made by those versed in the art, it is intended that the preceding specification should be construed as illustrative and not in a limiting sense.

What is claimed is:

1. A process for storing a fuel element irradiated in a sodium-cooled nuclear reactor, which comprises immersing said element in a first vessel containing a sodium-containing heat transfer fluid, placing the first vessel in a second vessel, and circulating an organic heat transfer fluid through the second vessel to cool the fuel element.

2. The process of claim 1, in which the organic heat transfer fluid is an inert material which is fluent from ambient temperature up to 300° C.

3. The process of claim 1, in which the heat transfer fluid is an alkyl phenanthrene produced by the catalytic decomposition of crude oil at temperatures between 312° and 362° C.

4. The process of claim 1, in which a plurality of fuel elements immersed in respective first vessels are placed in said second vessel, and in which the organic heat transfer fluid is circulated through the second vessel to simultaneously cool said plurality of fuel elements.

* * * * *